United States Patent [19]

Greenshields et al.

[11] Patent Number: 5,024,821

[45] Date of Patent: Jun. 18, 1991

[54] SOLVENT EXTRACTION PROCESS

[75] Inventors: James N. Greenshields, Hockessin, Del.; Peter E. Tetlow, Phoenix, Ariz.

[73] Assignee: ICI Americas Inc., Wilmington, Del.

[21] Appl. No.: 486,494

[22] Filed: Feb. 28, 1990

[51] Int. Cl.$^5$ .............................................. C01G 43/00
[52] U.S. Cl. .................................................... 423/23
[58] Field of Search ......................................... 423/23

[56] References Cited

U.S. PATENT DOCUMENTS 3,224,873 12/1965 Swanson ................................. 423/23
4,032,332 6/1977 Gerlach ................................. 423/23
4,427,640 1/1984 Bowerman ............................. 423/63

OTHER PUBLICATIONS

C. J. King, Separation Processes, 2d edition, pp. 633-634 (McGraw-Hill 1980).

*Primary Examiner*—Peter D. Rosenberg
*Attorney, Agent, or Firm*—William E. Dickheiser

[57] ABSTRACT

A metal extraction process in which an aqueous leach solution containing metal values is contacted with a solution, in a water-immiscible organic solvent, of an extracting agent where the aqueous leach solution contains a wetting agent in a concentration of not more than 0.1% by weight. Wetting agents which may be used include alkoxylated alcohols or phenols, especially alcohols condensed with both ethylene oxide and propylene oxide, and ethylene oxide/propylene oxide/ethylene oxide block copolymers. The wetting agent can be present at a concentration of 0.00001% w/v or less. The presence of the wetting agent may reduce the build up of solid as crud and/or may reduce entrainment of one phase in the other.

28 Claims, No Drawings

SOLVENT EXTRACTION PROCESS

This invention relates to solvent extraction processes, particularly to processes for extracting metals from aqueous solutions as in processes of leaching ores with acids followed by extraction using water-immiscible solutions of a suitable extracting agent.

It is known to extract metals, for example copper, from aqueous solutions containing the metal as a salt thereof by contacting the aqueous solution with a solution of an extracting agent in a water immiscible organic solvent. The solvent phase loaded with metal, that is containing the metal in the form of a chelate compound with the extracting agent is then separated from the aqueous phase. The metal can then be stripped from the metal loaded solvent phase by contacting with a suitable aqueous solution, for example an aqueous acid solution. The metal may be recovered from the metal rich aqueous strip solution using any suitable technique, a commonly used technique being electrowinning of the metal.

In several commercial solvent extraction processes, the extraction of copper from an aqueous leach solution is effected in the manner described using at least one 2-hydroxyaryloxime as the extracting agent. Using such extracting agents, the reaction resulting in the formation of the metal chelate compound also forms acid and causes a lowering of the pH. This reaction is reversible and proceeds to an equilibrium point which favours formation of the chelate compound as the pH is increased. The aqueous solution which contains the metal and from which metal is to be extracted is frequently a leach liquor obtained by extracting a metal ore with an acid. In some cases such a leach liquor has a low pH which does not favour the formation of the chelate compound. Hence, only those 2-hydroxyaryloximes which have a strong chelating power are able to achieve a satisfactory degree of extraction from those aqueous leach liquors which have a low pH (for example a pH of not more than two), or which have a high copper content, for example of 15 $gdm^{-3}$, or greater. Since a low pH favours break down of the chelate compound, stripping is typically effected using an aqueous solution having a lower pH than the pH of the aqueous leach solution.

The advantage of high copper extraction shown by these strongly chelating oximes is to some extend offset by the fact that the complexed copper is not readily recovered by stripping with acid of convenient strength. An increase in the amount of copper recovered in the stripping stage would, in the absence of any comparable reduction in the degree of copper extraction from the aqueous solution, afford an improvement in the overall efficiency of the process. It has been found that the addition of certain compounds to the oxime have this effect and produce an increase in the amount of copper transferred from the leach solution to the stripping solution.

In UK Patent No 1549615 it is shown that, in the stripping stage, the amount of copper removed from a solvent phase containing a strongly chelating oxime is significantly increased if the solvent phase contains a defined phenol. In the above specification it is also disclosed that certain aliphatic alcohols, such as tridecanol, have similar beneficial effects. Compounds which have such an effect are sometimes referred to as "strip modifiers" or, more simply, as "modifiers".

It has been found that modifiers will not only influence the strength of the extractant, but can also effect the hydrolytic stability and the selectivity of extraction of the desired metal over other, undesired, metals present in the initial aqueous phase. Other factors which can be affected are the level of entrainment of one phase in the other, for example organic phase in aqueous phase, the kinetics of the extraction and stripping stages and the generation of crud. A suitable modifier will therefore often be the result of a compromise.

'Crud' is a term applied to undesirable extraneous matter formed at the organic-aqueous interface or in the organic phase in the settler compartment of mixer settlers used in the solvent extraction process. Crud is often an oil-water emulsion, or a mixed emulsion, stabilised by the presence of finely divided solid material that may be present in the feed, for example an alumina silicate or colloidal silica precipitated during the solvent extraction operation. Crud can accumulate in sufficient quantities to seriously reduce the working volume of a settler leading to flooding. Where large quantities of crud are produced it has to be removed and possibly the emulsion broken by centrifuging. Crud can be a source of loss of reagent by entrainment or entrappment of reagent in the emulsion and this can occur even if centrifuging is used since the emulsion may be incompletely broken.

In solvent extraction operations employing banks of mixer settlers operated in a continuous fashion, it is inevitable that after the primary separation of the organic and aqueous phases in the settlers, there remains some entrainment of one phase in the other. This entrainment is in the form of minute droplets that are very slow to coalesce or settle and are thus carried through with the primary phase. In the case of droplets of organic material which are entrained in the aqueous phase, this represents a major loss of the extraction reagent from the plant, both in organic material entrained in the discarded raffinate from the extraction circuit and in organic material transferred to the electrolyte in the stripping stage. In the latter case the entrained organic material may cause further complications by interfering with the clean deposition of copper and may cause burning of the electrodes. In the case of entrainment of droplets of aqueous in organic phase, this represents a means of physical transfer of unwanted metals such as iron present in the aqueous feed solution, that may outweigh the advantages of the high selectivity of an extractant reagent for copper over other metals. It is therefore very desirable to maintain entrainment at as low a level as possible. Various physical means may be used to try to minimise entrainment and it has been found that the reagent composition employed can have an effect on entrainment levels. Thus there are distinct advantages in reagents which minimise formation of entrainment of one phase in another.

Extractant systems have been developed which contain a modifier, or which are a mixture of extractants, or which contain a modifier and a mixture of extractants, and some of these systems are indicated to give better control of crud formation and/or to reduce entrainment. However, the composition of the leach liquors varies with the ore being treated. Furthermore, the finely divided solid which is the primary source of crud can vary in type and particle size depending on the ore and on its treatment. Hence, the treatment of some leach liquors can give problems of crud formation and/or entrainment even when using extractant systems which, with other leach liquors, show better crud control and/or reduced entrainment.

Hence, there remains a need for a process which can be used for metal extraction and which better controls crud formation and/or reduces entrainment.

According to the present invention there is provided a solvent extraction process for the recovery of a metal from an aqueous solution thereof which includes a stage in which the aqueous solution is contacted, in the presence of a wetting agent, with a solution of an extracting agent in a water immiscible organic solvent.

The solvent extraction process and the extracting agent may be any that have been previously described, for example in British Patents 1322532; 1421766; 1440917; 1456056; 1549615; 2133004 and 2150133 and European Patent Specifications 057797; 085522; 112617; 193307; 196153 and 202833. Other processes and extracting agents are described in U.S. Pat. Nos. 3428449; 3655347; 4507268 and 4544532 and Belgian Patents 804030 and 804031.

The process of the present invention is conveniently effected using, as the extracting agent, at least one or more 2-hydroxyaryloximes, which may be used together with strip modifiers, kinetic modifiers or both. Such systems are disclosed in the patent specifications noted previously herein. Kinetic modifiers, and the function thereof, are discussed in more detail in U.S. Pat. Nos. 4507268 and 4544532.

It is preferred that the extracting agent comprises at least one 2-hydroxyaryloxime which is a strong metal extractant, as hereinafter defined. The extracting agent may also include at least one 2-hydroxyaryloxime which is a weak metal extractant, as hereinafter defined.

By strong metal extractant is meant those 2-hydroxyaryloximes which, in 0.2 molar solution in an aliphatic hydrocarbon solution, when loaded with 50% of the theoretical uptake of copper will be in equilibrium with a 0.1 molar solution of copper as copper perchlorate at a pH less than 1. In contrast, by a weak metal extractant is meant those 2-hydroxyaryloximes which, in the above test, are in equilibrium at pH about 1.2 or higher. Mixtures of strong and weak metal extractants may be used and such mixtures include the mixtures of aldoximes and ketoximes disclosed in U.S. Pat. Nos. 4507268 and 4544532.

Strong metal extractants of value for extracting metal values from aqueous solutions of metal salts are well known and include, for example, alkyl or alkoxyhydroxybenzaldoximes as described in Belgian Patent No. 796835. Other strong metal extractants include 2-hydroxyarylketoximes which contain an electron-withdrawing substituent, for example a halogen atom such as a chlorine atom, in the 3-position.

Weak metal extractants include 2-hydroxyarylketoximes which are devoid of electron-withdrawing substituents in the 3-position. Extractants of this type include 2-hydroxyaryl alkyl ketoximes, 2-hydroxyarylbenzyl ketoximes and 2-hydroxybenzophenone oximes.

The extractant should be soluble in water-immiscible organic solvents used in solvent extraction processes and furthermore should form derivatives with desired metals which are also soluble in the water-immiscible organic solvents. In order to confer adequate solubility of the extractant and its metal derivative in the water-immiscible organic solvent, the extractant should desirably contain substituent groups, for example alkyl or alkylene groups or acyl or acyloxy groups, which contain at least three carbon atoms. In general the substituent group contains at least six and especially at least eight carbon atoms. The substituent group may contain thirty, or even more, carbon atoms but in general no significant advantage is achieved with substituent groups containing more than thirty carbon atoms. Typically the substituent group contains not more than 24, and especially not more than 20, carbon atoms. The substituent group may be, or contain, a straight chain alkyl group but it is preferred that the substituent group is, or contains, a branched alkyl group. A particularly preferred class of extractant is one in which the substituent group is a mixture of branched isomers, or is a mixture of alkyl groups having different numbers of carbon atoms or is a mixture of both isomers and alkyl groups having different numbers of carbon atoms.

Particularly useful strong metal extractants, owing to their ability to deal with aqueous solutions containing high copper concentrations and their rapid rates of metal transfer, are the alkyl 2-hydroxybenzaldoximes, especially wherein the alkyl groups are branched chain alkyl groups, for example mixed 5-nonyl-2-hydroxybenzaldoximes, mixed 5-heptyl2-hydroxybenzaldoximes, and mixed 5-dodecyl2-hydroxybenzaldoximes, in which the components of the mixture differ in configuration of the branched chain alkyl group. Such aldoximes can be derived by formylation and oximation from the mixed 4-alkylphenols obtained by condensation of phenol with a mixed alkyl compound such as propylene trimer or tetramer.

Useful extractants include mixtures of strong 2-hydroxybenzaldoximes of the type described previously herein and the weak 2-hydroxyarylketoximes of the type referred to earlier, such ketoximes being described in U.S. Pat. No 3428449 and Belgian Patents 804030 and 804031. Suitable mixtures of benzaldoximes and ketoximes are described in European Patent Publication No 85522.

The process of the present invention typically comprises the steps of a. contacting an aqueous solution containing metal with a solution in a water-immiscible organic solvent of an extracting agent;

b. separating the aqueous and solvent phases, the latter containing metal complex;

c. contacting the solvent phase with an aqueous mineral acid; and d. separating the solvent phase from the aqueous phase containing metal in the form of a salt of the mineral acid; wherein at least step (a) is effected in the presence of a wetting agent.

Such a process can be used for the recovery of metals such as copper, nickel, uranium or zinc, particularly copper.

Wetting agents are a known type of material and are a broad class of surfactant which are distinguished by their ability to promote the wetting of a variety of surfaces with water. Wetting agents are used to wet fabrics in the textile industry and also solid surfaces of metal, ceramic and glass in domestic and industrial dish-washing equipment in which they are referred to as "rinse aids". Wetting agents are also used in the agrochemical and pharmaceutical industries.

The wetting agent may be one which is soluble in either water or in the water-immiscible organic solvent. Conveniently the wetting agent is one which is soluble in water.

The amount of wetting agent used is dependent on the quantity and type of the particulate solid present in the aqueous leach liquor. The wetting agent is used in an amount sufficient to reduce problems associated with the presence of fine particulate mineral solids and/or to reduce problems of entrainment of droplets of one phase in the other phase. However, the use of a large proportion of wetting agent may result in undesirable foaming during the mixing of the two phases or may give rise to unacceptable phase disengagement characteristics. The proportions of wetting agent used will be dependent on the nature of the particular system, especially the particulate solid and the quantity thereof, and the nature of the wetting agent but in general will not exceed 0.1% w/v of wetting agent relative to the liquid phase in which the wetting agent is dissolved. In general we prefer to use not more than 0.01% w/v of wetting agent. A useful effect can be observed when the amount of wetting agent used is as little as 0.00001% w/v or even less. The use of wetting agent in an amount in the range of at least 0.0001% w/v and not more than 0.001% w/v has been found to give a practically useful effect.

The wetting agent is typically a surface-active compound which contains hydrophilic and hydrophobic units. The wetting agent can be an amphoteric, anionic, cationic or nonionic compound. Anionic compounds typically contain sulphate, sulphonate or carboxylate groups such as in long chain alkyl sulphates, sulphonates or carboxylates containing at least eight carbon atoms and in long chain alkyl-substituted aryl sulphates, sulphonates or carboxylates containing at least eight carbon atoms in the alkyl group. Cationic compounds typically contain quaternary ammonium groups having at least one long chain alkyl group with eight or more carbon atoms. Nonionic compounds are typically alkoxylated compounds, particularly polyalkoxylated compounds, but can be esters of long chain aliphatic acids containing at least eight carbon atoms in the aliphatic group, particularly esters of polyhydroxy compounds such as sorbitan.

The wetting agent may be soluble in either the aqueous phase or the organic phase. Wetting agents which are soluble in the aqueous phase are readily handled and may be present during only steps (a) and (b) of the metal extraction process. Wetting agents which are soluble in the organic phase will be present in the organic phase and hence will be present during all of steps (a) to (d). To minimise the possibility of the wetting agent having a deleterious effect on the metal extraction process, it is preferred to avoid the presence of the wetting agent during all of the stages of the metal extraction process and hence wetting agents which are soluble in the aqueous phase are preferred.

Nonionic compounds which are wetting agents are readily available and such nonionic compounds may be used in the process of the present invention.

Nonionic wetting agents which are soluble in the aqueous phase include ethylene oxide - propylene oxide block copolymers of the type $(EO)_x(PO)_y(EO)_z$ where x, y and z are integers. The values of x and y are typically such that the block copolymer contains at least 5% by weight of ethylene oxide units. In general the values of x and y are such that the block copolymer contains not more than 40% by weight of ethylene oxide units. In general such block copolymers will contain at least 10%, and not more than 30%, by weight of ethylene oxide units. The value of y is such that the propylene oxide block has a molecular weight of at least 1000. In general y is such that the propylene oxide block has a molecular weight of not more than 5000. Preferred block copolymers are those in which the propylene oxide block has an average molecular weight which is at least 1500 and is not more than 3500.

Alternatively the nonionic wetting agent is an alkoxylated alcohol wherein the alcohol contains an alkyl group of at least four and preferably at least eight carbon atoms, or an alkoxylated polyol such as sorbitol. The alcohol may be ethoxylated and suitable compounds of this type preferably contain an average of at least four, and especially at least five, ethoxy ($C_2H_4O$) groups. Alternatively an alcohol block or random alkoxylate may be used, specifically with a block or random ethoxy/propoxy polymer chain.

Preferred wetting agents have a low to moderate hydrophilic-lipophilic balance (HLB), for example an HLB in the range 4 to 12, and especially 6 to 10 under the conditions of use. HLB is discussed in Kirk-Othmer "Encyclopaedia of Chemical Technology", Third Edition, Volume 8, pages 910 and 911 and may be determined by the procedures noted therein, for example in J. Soc. Cosmet. Chem. 5, 249 (1954) and Proc. Sci. Sec. Toilet Goods Assoc. 6(6), 43, (1946), both being papers by W. C. Griffin.

Wetting agents which can be used in the process of the present invention include the condensation product of decanol with an average of at least five and not more than ten ethoxy groups, ethoxylated dodecanol containing about 40% by weight ethylene oxide units and other ethoxylated alcohols having a similar HLB. An alcohol EO/PO block copolymer such as a mixed ($C_{13}$–$C_{15}$ alkyl) alcohol with at least six ethoxy and at least three propoxy groups, on average, has been found to give a reduction in the entrainment of the aqueous phase in the organic phase together with some consolidation of the crud even when used at a level of 0.0001% w/v. Ethylene oxide-propylene oxide-ethylene oxide block copolymers may be used, for example such copolymers containing 10 to 20% by weight of ethylene oxide and wherein the average molecular weight of the propylene oxide block is in the range 1500 to 2000.

Preferred wetting agents when used in the process of the present invention result in consolidation of the crud in the settler section of the mixer-settler and the consolidated crud is then more readily removed and furthermore the removal of such consolidated crud does not necessitate the removal of as much of the liquid phase as in the absence of the wetting agent, the liquid phase removed with the crud being wholly, or predominantly, the organic phase which contains extracted metal.

When using a wetting agent soluble in the aqueous phase, this may be introduced directly into the mixer, or even the settler. However, in order to allow the wetting agent to be satisfactorily distributed through the aqueous phase, the wetting agent is conveniently metered into the aqueous phase before it enters the mixer-settler. If a wetting agent soluble in the organic phase is used, this may be added to the organic phase in a similar manner.

With the exception of the use of the wetting agent, the process of the present invention may be effected in the known manner for the extraction of a metal from an aqueous solution thereof using extractants or extractant mixtures known for such a process.

The amount of extractant used will depend upon the concentration of metal salt in the aqueous solution, the plant design and the particular extractant. When using a 2-hydroxyaryloxime, it is preferred to use from 0.5 g to 300 g of the oxime per dm³ of organic solution. Higher concentrations afford organic phases of too high viscosity for convenient handling and lower concentrations involve the use of unnecessarily large volumes of solvent.

2-hydroxyaryloximes are typically used for the extraction of copper and when used with aqueous solutions containing 0.5 g or more per dm³ of metal such as copper it is preferred to use 0.75 to 250 g of oxime per dm³ of organic solution in conjunction with an amount of a modifier which is suitably from 10% to 200% of the weight of the oxime, and especially from 20% to 100%. The effect of the modifier is more marked the higher the concentration of oxime and comparatively lower proportions of the modifier with respect to the oxime are required to bring about a satisfactory improvement in strip efficiency when operating at high oxime concentrations. Modifiers which may be used include alcohols, phenols and esters as described in the patent specifications noted previously herein, such as British Patent 1549615 and European Patent Specification 202833.

The first and second steps of the process may conveniently be carried out by bringing together the aqueous solution and the solution of the oxime in the organic solvent, in the presence of the wetting agent, at a suitable temperature, usually ambient temperature which may be below 0° C. up to 50° C. depending on the location of the plant and the time of year. Somewhat higher temperatures may be used if operationally convenient. The liquid phases are agitated to disturb the mixture of liquids so that the area of the water-solvent interfacial layer is increased in order to promote complex formation and extraction. The agitation or disturbance is then decreased so that the aqueous and solvent layers settle and can be conveniently separated. The process may be carried out in a batchwise manner or preferably continuously, for example in a mixer-settler.

The amount of organic solvent to be used may be chosen to suit the volume of aqueous solution to be extracted, the concentration of metals, and the plant available to carry out the process. It is preferred, especially when operating the process continuously, to bring together, in a mixer-settler, approximately equal volumes of the organic solution and the aqueous solution. Part of at least one of the liquid phases in the mixer-settler may be recycled from the settler to the mixer in order to attain the desired phase ratio in the mixer.

The conditions, particularly pH values, under which first and second steps of the process are carried out are chosen to suit the metal or metals present in the aqueous solution. It is generally desirable that under the chosen conditions any other metals present should not form stable complex compounds with the oxime in order that substantially only the desired metal is extracted from the aqueous solution. Since formation of the complex compound may involve the liberation of acid, it may be necessary to add, for example, alkali during the process to maintain the pH within the desired range in which the metal complex is stable. However, it is generally preferable to avoid this, especially in a continuously-operated process.

The process of the invention can be used for the extraction of copper with 2-hydroxyaryloximes and since copper forms a complex with such oximes which is stable at low pH values, by operating at pH below 3 copper can be extracted substantially free from iron, cobalt and nickel.

As organic solvents there may be used any mobile organic solvent or mixture of solvents which is immiscible with water and, under the pH conditions used, inert to water, and to the oxime. Such solvents are especially aliphatic, alicyclic and aromatic hydrocarbons and mixtures of any of these, particularly mixtures which have little or no aromatic hydrocarbon component. Halogenated, particularly chlorinated, hydrocarbons may also be used including, as solvents more dense than water, highly halogenated hydrocarbons such as perchloroethylene, trichloroethane, trichloroethylene and chloroform. However, the use of halogentated hydrocarbons is not preferred for environmental reasons.

The third and fourth steps of the process may conveniently be carried out by bringing together the metal-bearing solution of the oxime in the organic solvent, obtained from the separation of the second stage of the process, and an aqueous solution of a mineral acid at a suitable temperature, usually ambient temperature, although somewhat higher temperatures may be used if operationally convenient, agitating or otherwise disturbing the mixture of liquids so that the area of the aqueous-solvent interfacial layer is increased in order to promote decomposition of the complex and recovery of the metal and then decreasing the agitation or disturbance so that the aqueous and solvent layer settle and then separating the layers. In the extraction stage, suitable relative volumes of advancing organic and advancing aqueous phases are those conventionally used in metal extraction processes for example in the range 1:1 to 30:1. In the stripping stage, the relative volumes of advancing organic and advancing aqueous phase are typically in the range 1:5 to 30:1. The process may be carried out in a batchwise manner or, preferably, continuously. The stripped organic layer, containing regenerated oxime, the modifier and some residual copper complex may be re-used in the first step of the process. The aqueous layer containing metal salt may be treated in any conventional manner, especially by electrolysis, to provide the metal.

The stripping acid may be any suitable acid and is preferably sulphuric, suitable strengths of which are from 100 to 250 g per dm³, especially 120 to 180 g per dm³. After removal of a convenient part of the metal by electrolysis the recovered aqueous acid, containing residual metal salt, may be re-used in the third step of the process.

Further details of aspects of the present invention are set out in the following examples, which are not limiting.

EXAMPLE 1

A series of tests of phase stability were carried out using a test vessel as used for specification testing of the extractants marketed b Acorga Limited and described in ICI Specialty Chemicals (Mining Chemicals) technical literature No 310-1E entitled "'Acorga' copper extractants: Standard methods of test; storage and handling" on page 4 with reference to FIG. 1. A conductivity meter and a conductivity probe were also used to determine the conductivity of the emulsion.

An extractant composition containing 5-nonyl-2-hydroxybenzaldoxime (50 parts by weight), tridecanol (19 parts by weight), 4-mixed nonylphenol (12 parts by weight), the remainder being a hydrometallurgical grade of kerosene available as Escaid from Exxon Corporation was used.

The extractant composition was diluted with a hydrometallurgical grade of kerosene available as Orfom SX-7 from Philips Petroleum Company in the proportions of 6 volumes of extractant composition to 100 volumes of the final solution.

400 cm$^3$ of the diluted extractant composition were equilibrated to a temperature of 5° C. in the test vessel. This organic solution was agitated with a stirrer set to 600 r.p.m.

To 400 cm$^3$ of an aqueous solution having a pH of 2.0 and containing copper at a concentration of 6 gdm$^{-3}$ and iron at a concentration of 3 gdm$^{-3}$, both metals being present as their sulphates, was added a sufficient quantity of a wetting agent to give a concentration of 0, 2.5, 5, 10, 20 or 50 ppm w/v of the wetting agent. This aqueous solution was cooled to 5° C. and was then added steadily to the stirred organic solution over a period of 15 seconds.

The two solutions were stirred together for three minutes during which time the conductivity probe was inserted into the mixture and the conductivity was determined. From the conductivity measurements and other observations, particularly during phase separation on stopping the stirrer, the phase stability of the system could be deduced.

The results obtained using different wetting agents are set out in Table One.

TABLE ONE

| Wetting Agent (a) | PS (b) |
| --- | --- |
| RE06P03 | OS |
| REOPOR | OS |
| EOPOEO | OS |
| DDAE04 | US |
| DAE05 | OS |
| SBODA | OS |
| PAS | OS |
| TDAE06 | OS |

Notes to Table One (a) RE06P03 is an alkoxylated alcohol of the type R(EO)$_x$(PO)$_y$ wherein the group R is the residue of a mixed (C$_{13}$-C$_{15}$) alcohol, x has an average value of six and y has an average value of three (100%).

REOPOR is an alkoxylated alcohol of the type R[(EO)(PO)] wherein the group R is the residue of a mixed (C$_{13}$-C$_{15}$) alcohol and [(EO)(PO)] is a random ethylene oxide-propylene oxide copolymer containing, on average, 22 ethylene oxide units and 26 propylene oxide units (100%).

EOPOEO is an ethylene oxide-propyleneoxide-ethylene oxide block copolymer containing 10-19% by weight of ethylene oxide and wherein the average molecular weight of the propylene oxide block is in the range 1500-2000 (100%).

DDAE04 is ethoxylated dodecanol containing, an average, four ethylene oxide units (100%).

DAE05 is ethoxylated decanol containing, on average, 5.5 ethylene oxide units (95%, remainder water).

SBODA is the sodium salt of sulphated butyl 9-octadecenoate (65%, remainder water).

PAS is polyalkoxylated sorbitol of the average composition sorbitol (containing 1% water), ethylene oxide (60 units), propylene oxide (31.2 units) (100%).

TDAE06 is ethoxylated tridecanol containing, on average, six ethylene oxide units (100%).

(b) PS is Phase Stability.

OS indicates that a stable, continuous organic phase was achieved at all concentrations of this wetting agent tested.

US indicates the continuous organic phase was unstable, particularly at the higher levels of this wetting agent, and a change in phase continuity, to a continuous aqueous phase, occurred.

EXAMPLE 2

A series of tests of the rate of phase disengagement were carried out.

The procedure used was as described in ICI Specialty Chemicals (Mining Chemicals) technical literature 310-IE on page 6 to determine the phase separation time with an organic continuous phase. The organic and aqueous phases, and the wetting agents, were as described in Example 1. The wetting agent was present in an amount of 20 ppm w/v relative to the aqueous solution.

To determine phase disengagement time with an aqueous continuous phase, the solutions which separated in the phase disengagement with an organic continuous phase were reagitated for three minutes with the stirrer in the aqueous phase to form an emulsion with an aqueous continuous phase. The phase disengagement time was then determined in the same manner as for the continuous organic phase. The results obtained are set out in Table Two.

TABLE TWO

| | Phase Separation Time (Sec) | |
| --- | --- | --- |
| Wetting Agent (a) | Organic Cont. (c) | Aqueous Cont. |
| NIL | 22-39 | 53-61 |
| RE06P03 | 22 | 51 |
| REOPOR | 46 | 62 |
| EOPOEO | 167 | 75 |
| SBODA | 72 | 57 |
| DAE05 | 77 | 55 |
| PAS | 67 | 81 |
| TDAE06 | 88 | 77 |
| DDAE04 | 56* | 53 |

Notes to Table Two
(a) is as defined in Notes to Table One.
(c) *under the test conditions phase inversion occurred to give an aqueous continuous phase.

EXAMPLE 3

A mixer-settler vessel formed from clear PVC was used to observe the effect of the addition of wetting agents on behaviour of the two phases in the settler section of the vessel.

The mixer-settler vessel had a mixer vessel of dimensions 3 inches × 3 inches × 3 inches (7.6 cm × 7.6 cm × 7.6 cm) separated by a weir from a settler vessel 2.25 inches long × 5 inches wide × 12 inches deep (5.7 cm × 12.7 cm × 30.5 cm).

The aqueous phase was a sample of leach liquor arising from a typical dump leach operation and had a pH of 2.1 and contained copper (0.68 gdm$^{-3}$) and iron (3.5 gdm$^{-3}$) as the sulphates.

The organic phase was the diluted extractant composition described and used in Example 1.

The aqueous phase and the organic phase were introduced continuously into the mixer vessel at equal volume flow rates to give an average residence time in the mixer vessel of 3 minutes. The mixer vessel was first flooded with the organic phase which was agitated and the aqueous phase was subsequently introduced in order to ensure the continuous phase in the mixer vessel was the organic phase.

Initially the aqueous solution was passed through the mixer-settler until a sufficient level of crud had built up in the settler vessel. The aqueous solution was then recycled to the mixer via a header/surge tank. The organic solution was recycled from settler to mixer at all times.

The mixer-settler vessel was operated continuously at an ambient temperature of about 25° C. for 12 hours and observations were then made, in the settler vessel, of interface or dispersion band depth, crud distribution and entrainment, both of organic in aqueous phase (O/A) and aqueous in organic phase (A/O).

A wetting agent was then added to the aqueous phase being introduced into the mixer vessel. The wetting agent was RE06P03, as defined in Note (a) to Table One. The wetting agent was added to give concentrations of 1, 3, 5 and 7 ppm w/v in turn. The addition of the wetting agent resulted in tighter packing of the crud, and also of the dispersion band. Some packing of the crud was attained using 1 ppm of this wetting agent and satisfactory packing was attained using 3 ppm of the wetting agent.

Entrainment showed some variation but the entrainment levels did not increase to an unacceptable level, even when using 7 ppm w/v of the wetting agent.

EXAMPLE 4

The procedure described in Example 3 was repeated with the exception that a different mixer-settler vessel of the same type and size was used and the wetting agent added was DAE05, as defined in Note (a) to Table One.

The results obtained were generally similar to those noted in Example 3 with the exception that packing of the crud required 3 ppm of the wetting agent and the entrainment of organic phase in aqueous phase was generally less than that observed in Example 3.

EXAMPLE 5

The procedure described in Example 3 was repeated with the exception that a different mixer-settler vessel of the same type and size was used and the wetting agent was SBODA, as defined in Note (a) to Table One.

The results obtained were generally similar to those of Example 3 with the exception that the crud became more tightly packed than in either Example 3 or Example 4 and the entrainment of aqueous phase in organic phase was generally less than that observed in either Example 3 or Example 4.

EXAMPLE 6

A series of experiments was carried out to determine the effect of wetting agents on the kinetics of copper extraction from an aqueous phase into an organic phase containing an extractant and also on the amount of copper transferred to the organic phase.

The apparatus and the method used were both as described in ICI Specialty Chemicals (Mining Chemicals) technical literature 310-1E. The apparatus used for sampling the mixture was a graduated 25 cm³ pipette having a safety filler.

The aqueous solution was as described in Example 3 and the organic solution was the diluted extractant composition described and used in Example 1. The solutions were equilibrated at 1° C. Wetting agents were added to samples of the aqueous solution. 400 cm³ of the organic solution were added to the test vessel at 1° C. 400 cm³ of the aqueous solution were then added whilst stirring the organic phase at 1270 r.p.m. Samples were removed from the stirred mixture at intervals of 5, 15, 30, 45, 60, 180 and 900 seconds, the phases were separated and analysed for copper content.

The proportions of wetting agent and the % approach to equilibrium are set out in Tables Three, Four and Five, where the 100% value is the amount of copper extracted after 900 seconds. The results in Table Three were obtained using SBODA as wetting agent, in Table Four using DAE05 as wetting agent and in Table Five using RE06P03 as wetting agent, all as defined in Note (a) to Table One.

Tables Six, Seven and Eight give the amount of copper in the organic phase after a contact time of 900 seconds using, as wetting agents, SBODA, DAE05 and RE06P03 respectively. It will be observed that the amount of copper in the organic phase was $0.62 \pm 0.02$ gdm$^{-3}$ in the absence of wetting agent or in the presence of up to 10 ppm w/v of wetting agent. Hence, under the conditions of the test, the addition of up to 10 ppm w/v of three different wetting agents had no significant effect either on the rate of extraction or the amount of copper extracted.

TABLE THREE

| Wetting Agent (ppm) | % Approach to Equilibrium at 1° C. | | | | | | |
|---|---|---|---|---|---|---|---|
| | 5 sec | 15 sec | 30 sec | 45 sec | 60 sec | 180 sec | 900 sec |
| Nil | 43.5 | 72.6 | 87.1 | 88.7 | 93.5 | 96.8 | 100.0 |
| 1.0 | 52.5 | 70.5 | 88.5 | 95.1 | 93.7 | 96.7 | 100.0 |
| 1.5 | 58.3 | 76.7 | 91.6 | 95.0 | 98.3 | 100.0 | 100.0 |
| 2.5 | 49.2 | 71.8 | 90.8 | 95.4 | 100.0 | 100.0 | 100.0 |
| 4.0 | 50.0 | 75.0 | 87.5 | 95.3 | 95.3 | 95.3 | 100.0 |
| 10.0 | 56.7 | 75.0 | 83.3 | 91.7 | 93.3 | 93.3 | 100.0 |

TABLE FOUR

| Wetting Agent (ppm) | % Approach to Equilibrium at 1° C. | | | | | | |
|---|---|---|---|---|---|---|---|
| | 5 sec | 15 sec | 30 sec | 45 sec | 60 sec | 180 sec | 900 sec |
| Nil | 43.5 | 72.6 | 87.1 | 88.7 | 93.5 | 96.8 | 100.0 |
| 1.0 | 54.8 | 85.5 | 91.9 | 96.8 | 96.8 | 96.8 | 100.0 |
| 1.5 | 31.5 | 55.6 | 81.0 | 87.3 | 95.2 | 95.2 | 100.0 |
| 2.5 | 58.5 | 83.1 | 93.8 | 96.9 | 96.9 | 98.5 | 100.0 |
| 4.0 | 46.8 | 79.0 | 88.7 | 93.5 | 95.2 | 98.9 | 100.0 |
| 10.0 | 45.0 | 63.3 | 75.0 | 93.3 | 95.0 | 93.3 | 100.0 |

TABLE FIVE

| Wetting Agent (ppm) | % Approach to Equilibrium at 1° C. | | | | | | |
|---|---|---|---|---|---|---|---|
| | 5 sec | 15 sec | 30 sec | 45 sec | 60 sec | 180 sec | 900 sec |
| Nil | 43.5 | 72.6 | 87.1 | 88.7 | 93.5 | 96.8 | 100.0 |
| 1.0 | 75.0 | 80.0 | 92.7 | 97.9 | 97.7 | 97.7 | 100.0 |
| 1.5 | 45.9 | 59.0 | 90.2 | 90.2 | 93.4 | 95.1 | 100.0 |
| 2.5 | 53.9 | 76.2 | 93.7 | 95.2 | 98.4 | 100.0 | 100.0 |
| 4.0 | 64.1 | 73.4 | 87.5 | 90.1 | 92.2 | 95.3 | 100.0 |
| 10.0 | 60.7 | 73.8 | 75.4 | 86.9 | 93.4 | 96.7 | 100.0 |

TABLE SIX

| Wetting Agent (ppm) | Cu in Organic Phase after 900 sec Contact (gdm$^{-3}$) |
|---|---|
| Nil | 0.62 |
| 1.0 | 0.61 |
| 1.5 | 0.60 |
| 2.5 | 0.64 |

TABLE SIX-continued

| Wetting Agent (ppm) | Cu in Organic Phase after 900 sec Contact (gdm$^{-3}$) |
|---|---|
| 4.0 | 0.64 |
| 10.0 | 0.60 |

TABLE SEVEN

| Wetting Agent (ppm) | Cu in Organic Phase after 900 sec Contact (gdm$^{-3}$) |
|---|---|
| Nil | 0.62 |
| 1.0 | 0.62 |
| 1.5 | 0.63 |
| 2.5 | 0.64 |
| 4.0 | 0.62 |
| 10.0 | 0.60 |

TABLE EIGHT

| Wetting Agent (ppm) | Cu in Organic Phase after 900 sec Contact (gdm$^{-3}$) |
|---|---|
| Nil | 0.62 |
| 1.0 | 0.60 |
| 1.5 | 0.61 |
| 2.5 | 0.63 |
| 4.0 | 0.64 |
| 10.0 | 0.61 | a settler vessel 24 inches long × 10 inches wide × 12 inches deep (61 cm × 25.4 cm × 30.5cm).

The aqueous solution was as described in Example 3 and was passed through the system without being recycled. The organic solution was essentially as described in Example 1 with the exception that the extractant composition had been diluted with a hydrometallurgical grade of kerosene available as Shellsol from Shell. The organic solution was recycled from the settler vessel to the mixer vessel, as in Example 3.

Operation was continued for an extended period. Observations were made, in both of the mixer-settler vessels, of the interface or dispersion band, the crud distribution and the entrainment, both O/A and A/O.

The results noted at various times of operation are set out in Table Nine.

TABLE NINE

| Vessel | WA (ppm) (d) | Time (hrs) | Interface (cm) F | C | R | Crud (cm) F | C | R | Entrainment (ppm) O/A | A/O |
|---|---|---|---|---|---|---|---|---|---|---|
| A | NIL | 19 | 0 | 0 | 0 | 16 | 12 | 9 | ND | 1500 |
| B | NIL | 19 | 0 | 0 | 0 | 15 | 12 | 9 | 40 | 1000 |
| A | 1* | 21 | 4 | 0 | 0 | 12 | 10 | 9 | 100 | ND |
| A | 1 | 24 | 4 | 0 | 0 | 8 | 13 | 9.5 | 40 | 900 |
| B | NIL | 24 | 0 | 0 | 0 | 15 | 17 | 12 | 200 | 2000 |
| A | 1 | 28 | 4.5 | 0 | 0 | 8 | 12 | 9 | 40 | 350 |
| B | NIL | 28 | 0 | 0 | 0 | 18.5 | 17 | 15 | 120 | 1800 |
| A | 1 | 42.5 | 3 | 0 | 0 | 3 | 16 | 7 | 30 | 600 |
| B | NIL | 42.5 | 0 | 0 | 0 | 16 | 18 | 16 | 100 | 1800 |
| A | 2* | 43 | ND | ND | ND | ND | ND | ND | ND | ND |
| A | 2 | 45 | 2.5 | 0 | 0 | 16 | 14 | 16 | 40 | 550 |
| B | NIL | 45 | 0 | 0 | 0 | 19 | 19.5 | 19.5 | ND | 2000 |
| A | 2 | 50 | 4 | 0 | 0 | 8 | 14 | 16 | 40 | 500 |
| B | NIL | 50 | 0 | 0 | 0 | 17 | 15 | 18 | 80 | 2300 |
| A | 2 | 66.5 | 3 | 0 | 0 | 8 | 11 | 15 | 80 | 400 |
| B | NIL | 66.5 | 0 | 0 | 0 | 18 | 17 | 20 | ND | 5000 |
| A | 5* | 67 | ND | ND | ND | ND | ND | ND | ND | ND |
| A | 5 | 70.75 | 13 | 11 | 0 | 0 | 13 | 16.5 | 80 | 800 |
| B | NIL | 70.75 | 0 | 0 | 0 | 18 | 17 | 20.5 | 80 | 2500 |
| A | 2* | 71 | ND | ND | ND | ND | ND | ND | ND | ND |
| A | 2 | 73.5 | 13 | 14 | 0 | 0 | 8 | 17 | 60 | 350 |
| B | NIL | 73.5 | 0 | 0 | 0 | 16 | 18.5 | 19.5 | 80 | 2200 |
| A | NIL* | 73.75 | ND | ND | ND | ND | ND | ND | ND | ND |
| A | NIL | 75 | 12 | 11 | 0 | 0 | 4 | 16 | 40 | 800 |
| B | NIL | 75 | 0 | 0 | 0 | 16 | 16.5 | 19 | 120 | 3000 |
| A | NIL | 92.5 | 10 | 8 | 0 | 0 | 2 | 4 | 40 | 700 |
| B | NIL | 92.5 | 0 | 0 | 0 | 17 | 17 | 21 | 80 | 3000 |

Notes to Table Nine
(d) WA is a Wetting Agent.
*This indicates the start of the addition of wetting agent or a change in the level of wetting agent added.
ND means this quantity was not determined.

In vessel A, the mixer operated with a continuous organic phase at all times. In vessel B, the mixer operated with a continuous organic phase for at least the first 19 hours but after 24 hours the continuous organic phase showed signs of instability which continued throughout the operation.

EXAMPLE 7

The procedure described in Example 3 was repeated operating at a lower ambient temperature of 0° to 5° C., and with two mixer-settler vessels in parallel.

Each mixer-settler vessel had a mixer vessel of dimensions 12 inches long × 10 inches wide × 12 inches deep (30.5 cm × 25.4 cm × 30.5 cm) separated by a weir from

EXAMPLE 8

In example 7, the mixer-settler was operated for 21 hours before adding wetting agent. The procedure of Example 7 was repeated with the exception that the wetting agent was added from the start of the run.

The results noted at various times of operation are set out in Table Ten.

TABLE TEN

| Vessel | WA (ppm) (d) | Time (hrs) | Interface (cm) F | C | R | Crud (cm) F | C | R | Entrainment (ppm) O/A | A/O |
|---|---|---|---|---|---|---|---|---|---|---|
| A | 1 | 1.25 | 0 | 0 | 0 | 3 | 2.5 | 12.5 | 160 | 2000 |
| B | NIL | 1.25 | 0 | 0 | 0 | 4 | 5 | 3 | 40 | 1500 |
| A | 1 | 4.75 | 0 | 0 | 0 | 11 | 12 | 10 | 0 | 200 |
| B | NIL | 4.75 | 0 | 0 | 0 | 13 | 13 | 13 | 2000 | 700 |

Notes to Table Ten
(d) is as defined in Notes to Table Nine.

EXAMPLE 9

The procedure of Example 7 was repeated using, as the wetting agent, DAE05, as defined in Note (a) to Table One.

The results noted at various times of operation are set out in Table Eleven.

TABLE ELEVEN

| Vessel (e) | WA (ppm) (d) | Time (hrs) | Interface (cm) F | C | R | Crud (cm) F | C | R | Entrainment (ppm) O/A | A/O |
|---|---|---|---|---|---|---|---|---|---|---|
| A | NIL | 19.25 | 0 | 0 | 0 | 14 | 12 | 9 | 120 | 1200 |
| B | NIL | 19.25 | 0 | 0 | 0 | 17 | 13 | 14 | 80 | 1200 |
| A | 1* | 19.75 | ND | ND | ND | ND | ND | ND | ND | ND |
| A+ | 1 | 21 | 0 | 0 | 0 | 15 | 14 | 10 | 120 | 1100 |
| B | NIL | 21 | 0 | 0 | 0 | 17 | 14 | 14 | 80 | 1400 |
| A+ | 1 | 27 | 3.5 | 0 | 0 | 14 | 14.5 | 13 | 80 | 600 |
| B | 1 | 27 | 0 | 0 | 0 | 18 | 15 | 20 | 80 | 1400 |
| A+ | NIL* | 27.25 | ND | ND | ND | ND | ND | ND | ND | ND |
| A | NIL | 43.5 | 0 | 0 | 0 | 16 | 16 | 18 | 160 | 3000 |
| B | NIL | 43.5 | 0 | 0 | 0 | 17 | 16 | 19 | 120 | 2500 |
| A | 1* | 43.75 | ND | ND | ND | ND | ND | ND | ND | ND |
| A+ | 1 | 44.5 | 3.0 | 0 | 0 | 13 | 13 | 20 | 80 | 900 |
| B | NIL | 44.5 | 0 | 0 | 0 | 18 | 15 | 20 | 80 | 2500 |
| A+ | 1 | 46.5 | 3.5 | 0 | 0 | 15 | 15 | 19 | 80 | 700 |
| B | NIL | 46.5 | 0 | 0 | 0 | 19 | 16 | 20 | 80 | 2300 |
| A+ | 2* | 46.75 | ND | ND | ND | ND | ND | ND | ND | ND |
| A+ | 2 | 47.5 | 3.5 | 0 | 0 | 15 | 15 | 20 | 40 | 400 |
| B | NIL | 47.5 | 0 | 0 | 0 | 20 | 18 | 18 | 40 | 2000 |
| A+ | 2 | 50.5 | 3 | 2 | 0 | 15 | 14 | 19 | 40 | 400 |
| B | NIL | 50.5 | 0 | 0 | 0 | 18 | 16 | 18 | 80 | 3000 |

Notes to Table Eleven
(d) is as defined in Note to Table Nine.
(e)+ indicates that there was a continuous organic phase in the mixer vessel at this time, at all other times the continuous organic phase showed signs of instability.

We claim:

1. A solvent extraction process of the recovery of a metal from an aqueous solution thereof which includes a stage in which the aqueous solution is contacted, in the presence of a wetting agent, with a solution of an extracting agent in a water-immiscible organic solvent.

2. The process of claim 1 wherein the extracting agent is one or more 2-hydroxyaryloximes.

3. The process of claim 2 wherein the extracting agent is used together with a strip modifier, a kinetic modifier or both.

4. The process of claim 2 wherein the extracting agent comprises at least one 2-hydroxyaryloxime which is a strong metal extractant.

5. The process of claim 4 wherein the extracting agent also includes at least one 2-hydroxyaryloxime which is a weak metal extractant.

6. The process of claim 5 wherein the extracting agent comprises a 2-hydroxyarylaldoxime and a 2-hydroxyarylketoxime.

7. The process of claim 1 wherein the extracting agent contains alkyl or alkylene substituent groups which contain at least six carbon atoms.

8. The process of claim 7 wherein the substituent group contains not more than 24 carbon atoms.

9. The process of claim 8 wherein the substituent is a mixture of branched isomers or is a mixture of alkyl groups having different numbers of carbon atoms or is a mixture of both of these.

10. The process of claim 9 wherein the extracting agent is mixed 5-nonyl-2-hydroxybenzaldoxime, mixed 5-heptyl-2-hydroxybenzaldoxime or mixed 5-dodecyl-2-hydroxybenzaldoxime.

11. The process of claim 1 which comprises
 a) contacting an aqueous solution containing metal with a solution in a water-immiscible organic solvent of an extracting agent;
 b) separating the aqueous and solvent phases, the latter containing metal complex;
 c) contacting the solvent phase with an aqueous mineral acid; and
 d) separating the solvent phase from the aqueous phase containing metal in the form of a salt of the mineral acid; wherein at least step (a) is effected in the presence of a wetting agent.

12. The process of claim 11 wherein the metal is copper.

13. The process of claim 1 wherein the wetting agent is present in an amount not exceeding 0.1% w/v of wetting agent relative to the liquid phase in which the wetting agent is dissolved.

14. The process of claim 13 wherein the amount of wetting agent is not more than 0.01% w/v.

15. The process of claim 1 wherein the wetting agent is present in an amount of not less than 0.00001% w/v of wetting agent relative to the liquid phase in which the wetting agent is dissolved.

16. The process of claim 13 wherein the amount of wetting agent is at least 0.0001% w/v and not more than 0.001% w/v.

17. The process of claim 1 wherein the wetting agent is an amphoteric, anionic, cationic or nonionic surface active compound.

18. The process of claim 17 wherein the wetting agent is an anionic surface active compound and is a sulphate, sulphonate or carboxyate.

19. The process of claim 17 wherein the wetting agent is a nonionic alkoxylated compound or a long chain acid ester of a polyol.

20. The process of claim 1 wherein the wetting agent is soluble in the aqueous phase.

21. The process of claim 20 wherein the wetting agent is a nonionic compound.

22. The process of claim 21 wherein the wetting agent is an alkoxylated alcohol wherein the alcohol contains an alkyl group of at least eight carbon atoms.

23. The process of claim 22 wherein the wetting agent is an ethoxylated alcohol which contains on average at least four ethoxy groups.

24. The process of claim 22 wherein the wetting agent is an alcohol block or random alkoxylate having a block or random ethoxy/propoxy polymer chain.

25. The process of claim 21 wherein the wetting agent is an ethylene oxide-propylene oxide-ethylene oxide block copolymer.

26. The process of claim 1 wherein the wetting agent has an HLB in the range 4-12 under the conditions of use.

27. The process of claim 1 wherein the wetting agent is an alcohol EO/PO block copolymer whereof the alcohol is a mixed ($C_{13}$–$C_{15}$ alkyl) alcohol condensed with at least six ethoxy groups and at least three propoxy groups and is used in an amount of at least 0.0001% w/v with respect to the aqueous phase.

28. The process of claim 1 which is effected in a mixer-settler vessel and the wetting agent is added to the aqueous solution before the solution enters the mixer-settler.

* * * * *